United States Patent [19]

Tomblin

[11] Patent Number: 5,786,047
[45] Date of Patent: Jul. 28, 1998

[54] BODYSIDE MOLDING WITH BRIGHT INSERT AND METHOD OF MAKING SAME

[75] Inventor: Brian R. Tomblin, Montville, Ohio

[73] Assignee: The Standard Products Company, Cleveland, Ohio

[21] Appl. No.: 797,394

[22] Filed: Feb. 10, 1997

[51] Int. Cl.⁶ .................................................. B60R 13/04
[52] U.S. Cl. ........................ 428/31; 52/716.5; 156/60
[58] Field of Search .......................... 428/31; 156/60; 52/716.5

[56] References Cited

U.S. PATENT DOCUMENTS

| | | | |
|---|---|---|---|
| 3,811,989 | 5/1974 | Hearn | 428/31 X |
| 3,881,042 | 4/1975 | Ungerer | 428/31 X |
| 3,959,537 | 5/1976 | Loew | 428/31 |
| 4,631,104 | 12/1986 | Jackson | 428/31 X |
| 5,149,478 | 9/1992 | Malm | 428/31 X |
| 5,182,145 | 1/1993 | Kato | 428/31 |
| 5,194,305 | 3/1993 | Shirahata et al. | 428/31 |
| 5,277,950 | 1/1994 | Zoller | 428/31 |
| 5,456,786 | 10/1995 | Cook et al. | 428/31 X |

*Primary Examiner*—Henry F. Epstein
*Attorney, Agent, or Firm*—Harness, Dickey & Pierce, P.L.C.

[57] ABSTRACT

A method of assembling a metal or decorative strip to a body side molding of a vehicle. The method includes forming a bodyside molding by extrusion, injection molding or another plastic forming process to a desirable cross-sectional configuration having a show side opening. The strip is shaped by forming and end punching the metal strip to a desirable shape and configuration. The formed metal strip and the bodyside molding are then placed in suitable fixtures in proximity to one another, and to a heat staking tool. The heat staking tool picks up the metal strip from the fixture such that the strip is heated. The heat staking tool then forces the heated metal strip into the opening in the bodyside molding under suitable pressure such that the metal strip melts the molding and the edges of the metal strip are embedded within the molding.

20 Claims, 3 Drawing Sheets

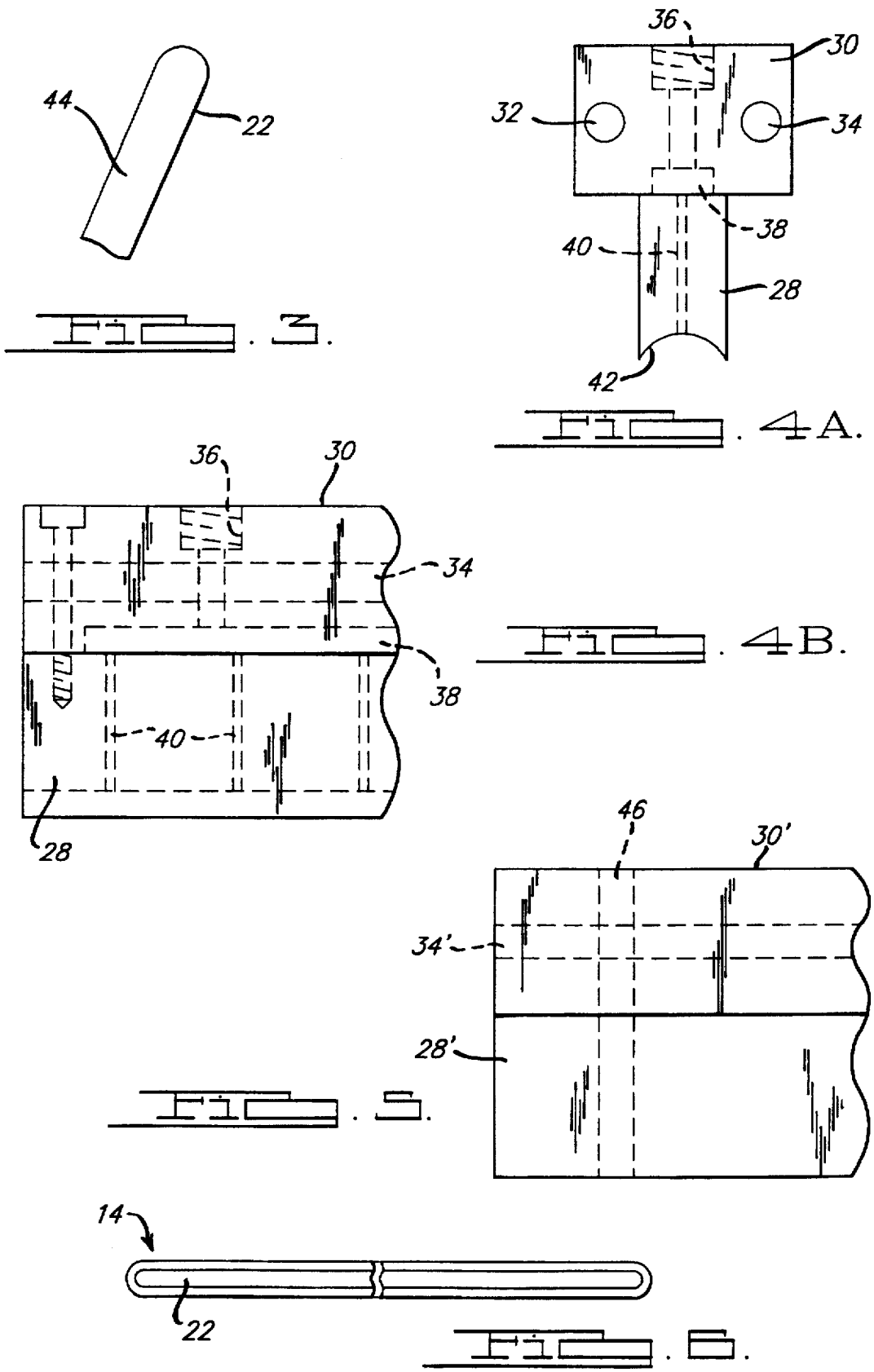

BODYSIDE MOLDING WITH BRIGHT INSERT AND METHOD OF MAKING SAME

BACKGROUND OF THE INVENTION

1. Field of the Invention

This invention relates generally to a bright or colored metallic strip for automotive exterior trim such as bodyside moldings and, more particularly, the process used for heat bonding the metallic strip into the molding.

2. Discussion of the Related Art

Decorative and protective bodyside moldings formed at least in part from thermoplastic materials that protect vehicle doors, and provide an aesthetically pleasing appearance are common in the automotive industry. Bodyside moldings of this type can be formed by both injection molding processes and extrusion processes. Bodyside moldings formed by extrusion processes have become increasingly more popular because of the versatility, efficiency and cost effectiveness of forming thermoplastic materials by extrusion processes.

To form bodyside moldings by an extrusion process, generally one or more continuous, pliable, thermoplastic melt streams from suitable extrusion dies are introduced into a forming tool which molds the melt stream into a continuous extrusion having a desirable cross-sectional shape. Bodyside moldings are then cut from the continuous extrusion after the extrusion has sufficiently cooled. In one type of an extrusion process to produce bodyside moldings of this type, a base layer melt stream is coextruded with an upper show surface layer having a desirable aesthetically pleasing appearance. The show surface material can be of various materials suitable for the extrusion process, including mylar, chrome, or a show thermoplastic graded material. Another method of providing bodyside moldings includes injection molding or extruding a bodyside molding having an opening along its show surface, and then using an adhesive tape or some other mechanical device to secure a bright strip such as steel or aluminum, or another bright extrusion, for example mylar or chrome, within the opening. The bright strip can have an adhesive on its non-show surface, that is heat activated to chemically bond with the polymer of the molding.

U.S. patent application Ser. No. 08/591,313, titled "Trim Member Including Intermittent Bright Strip and Method of Making Same," assigned to the assignee of the instant application, and herein incorporated by reference, discloses a process of extrusion in which intermittent sections of a bright or colored strip are coextruded with a clear or translucent thermoplastic melt stream to produce a trim strip having spaced apart sections of bright or colored strips. The process includes intermittently placing bright or colored strip sections between two continuous thermoplastic melt strip streams as the melt streams are directed into a pair of cooperating forming rolls. The forming rolls mold the thermoplastic melt streams around the bright strip or colored strip sections to define a desirable shape of an extruded strip product. The extruded strip product is then cut at desirable places such as between the bright strip or colored strip sections.

Although methods of producing bodyside moldings including outer layers of metal or other bright strips have generally been successful, there is still room for improving these processes to reduce expense and increase quality. It is an object of the present invention to form a bodyside molding having an outer metal or bright strip that offers advantages over the known processes.

SUMMARY OF THE INVENTION

In accordance with the teachings of the present invention, a method of assembling a metal or decorative bright strip to a bodyside molding of a vehicle is disclosed. The method includes forming a bodyside molding by extrusion, injection molding or other plastic forming process to a desirable cross-sectional configuration having a show side opening. A metal strip is provided that can be shaped by rolling or other means, and end punched to a desirable shape and configuration. The formed metal strip and the bodyside molding are then placed in suitable fixtures in proximity with one another, and to a heat staking tool. The heat staking tool picks up the metal strip from the fixture such that the strip is heated. The heat staking tool then forces the heated metal strip into the opening in the bodyside molding under suitable pressure such that the metal strip melts the molding and the edges of the metal strip are embedded within the molding.

Additional objects, advantages and features of the present invention will become apparent from the following description and appended claims, taken in conjunction with the accompanying drawings.

BRIEF DESCRIPTION OF THE DRAWINGS

FIG. 3 is a broken-away top view showing a formed and punched metal strip that is to be secured to the bodyside molding using the heat staking tool shown in FIG. 2;

FIG. 4(a) is an end view and FIG. 4(b) is a broken-away side view of a portion of the heat staking tool shown in FIG. 2;

FIG. 5 is a broken-away side view of a portion of a heat staking tool according to another embodiment of the present invention;

FIG. 6 is a top view of a bodyside molding, according to an embodiment of the present invention, after the metal strip has been staked to the molding;

DETAILED DESCRIPTION OF THE PREFERRED EMBODIMENTS

The following description of the preferred embodiments directed to a method of heat staking a metal or other bright strip to a bodyside molding of a vehicle is merely exemplary in nature, and is in no way intended to limit the invention or its applications or uses.

Figure 1:
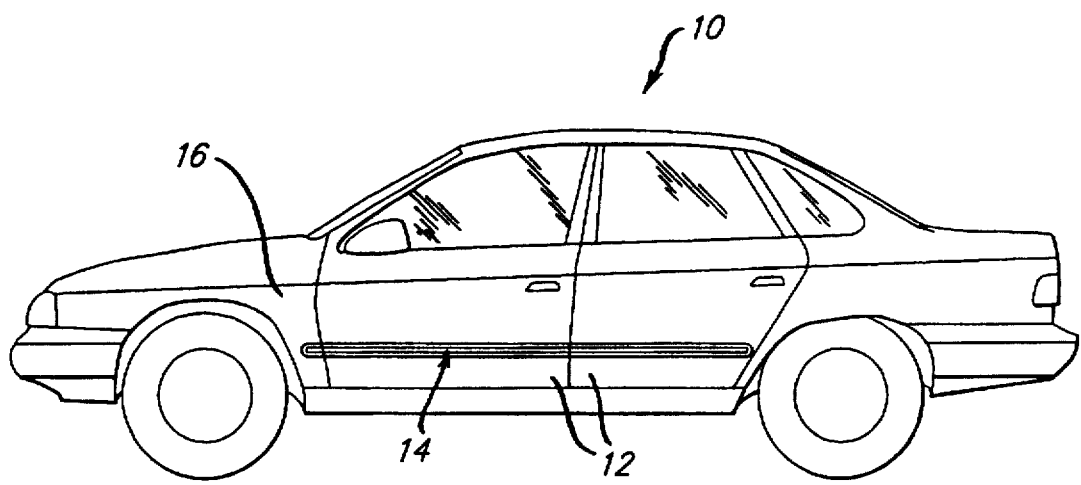
FIG. 1 is a side view of a vehicle incorporating a bodyside molding that is made according to a method of the present invention.

FIG. 1 shows a side view of a vehicle 10 including a vehicle door 12. A protective and decorative bodyside molding 14, formed from a process according to an embodiment of the present invention, is secured to an outer panel of the door 12 and a side panel 16 of the vehicle 10 by appropriate fastening, locating and securing devices, such as locating members and adhesive tape, in a manner that is well understood in the art. The bodyside molding 14 provides decoration to the vehicle 10, and also protects the paint finish of the vehicle door 12 and the side panel 16 against scratches, scrapes and dings resulting from contact with rigid objects, such as other vehicle doors, around the vehicle 10. As will be discussed in detail below, the bodyside molding 14 includes a decorative metal or bright or colored strip secured to an outer surface of the molding 14 according to the invention.

Figure 2:
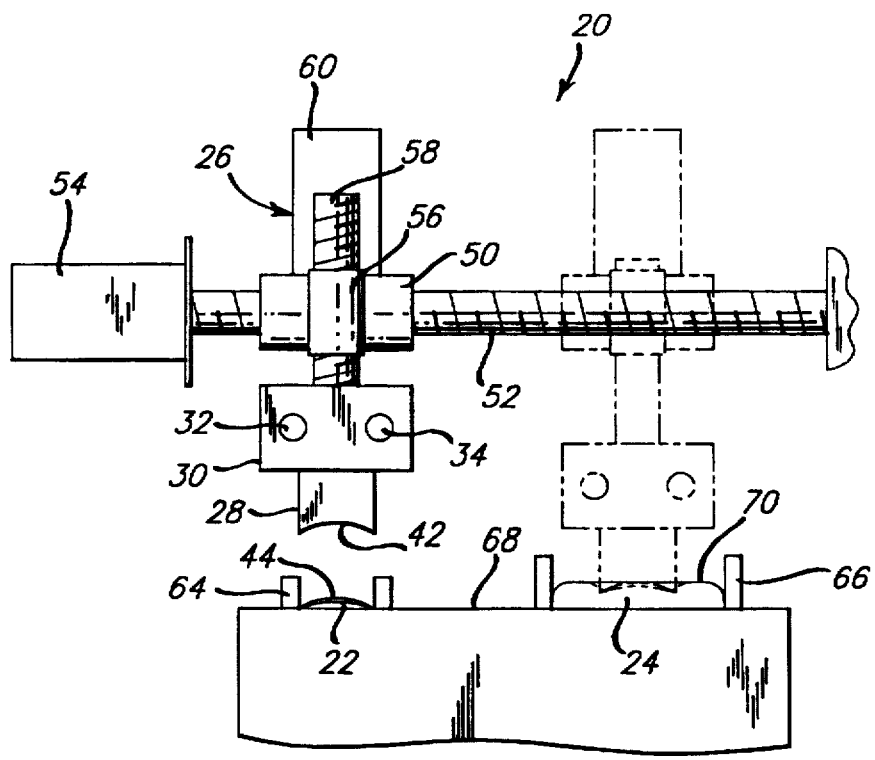
FIG. 2 is a plan view showing the assembly of a metal strip to the bodyside molding shown in FIG. 1 using a heat staking tool, according to the invention.

FIG. 2 shows a plan view of a system 20 for securing a metallic bright strip 22 to a bodyside molding base 24. The bodyside molding base 24 is made from any suitable injection molding, extrusion or other thermoplastic forming process known in the art, and is typically made of a thermoplastic material, such as PVC, TPO, or other suitable moldable material. The bright strip 22 is a heatable strip such as a metal strip, for example, a 430 series stainless steel or aluminum, and having a width of about ½ inches in one embodiment. Stainless steel is preferred over aluminum because it does not have corrosion concerns. However, the strip 22 can be any desirable material for a particular vehicle application.

FIG. 3 shows a broken away top view of the strip 22 before being attached to the molding base 24. The strip 22 has been roll formed to have the desired curved shape, or any other suitable shape, and is end punched to a desired shape. The thickness of the strip 22 is generally between about 0.010 and 0.015 inches to be suitable for these processes.

The system 20 includes a heat stake tool assembly 26. The heat stake assembly 26 includes a heated staking tool 28 heated by known means such as a heater block 30. Resistance heating rods 32 and 34 extend the length of the heating block 30 to heat the heating block 30 and the tool 28 to a temperature of about 400°–550° F., in one embodiment. A thermocouple (not shown) is used on the heater block 30 in conjunction with a temperature controller to maintain desired conditions. FIG. 4(a) shows an end view and FIG. 4(b) shows a broken away side view of the heater block 30 and the tool 28 separated from the rest of the heat stake assembly 26.

In order to secure the strip 22 to the tool 28 a vacuum system is provided, in one embodiment. The heater body 30 includes a plurality of vacuum ports 36 that connect to a common vacuum manifold 38 running the length of the heater block 30. The vacuum ports 36 extend down to be connected to the manifold 38 between the heater rods 32 and 34 at regular intervals along the heater body 30. The vacuum manifold 38 is in communication with a plurality of vacuum lines 40 extending down the tool 28 at regular intervals, for example, every seven to eight inches. In this manner, a vacuum from a vacuum system (not shown) applied to the ports 36 creates suction at a surface 42 of the tool 28 where the lines 40 are open. The shape of the surface 42 cooperates with a top surface 44 of the strip 22.

In an alternate embodiment, a magnetic system is used to secure the strip 22 to the tool 28, and thus, the vacuum ports 36, the vacuum manifold 38, and the vacuum lines 40 can be eliminated. FIG. 5 shows a broken away side view of a heating block 30' and a staking tool 28' showing this alternate embodiment. A magnetic rod 46 extends vertically through the heater body 30' and the staking tool 28' such that an end of the rod 46 is exposed at the surface 42. A plurality of magnetic rods are provided, and are spaced apart about every eleven inches in one embodiment. The magnetic attraction between the rods 46 and the metallic strip 22 causes the metallic strip 22 to be secured to the tool 28'.

To perform the operation of assembling the strip 22 to the bodyside molding base 24, the tool 28, in this embodiment, moves vertically and horizontally. To provide movement in the horizontal direction, an X-motion linear translator 52 (ball bushing/guide rod in one example) is coupled with a cylinder 54. The cylinder 54 causes the support base 50 to move the tool 28 along the linear translator 52 from a position directly above the strip 22 to a position directly above the body side molding base 24, and back again. Likewise, a vertical support base 56 of the assembly 26 is mounted to a Y-motion linear translator 58. A cylinder 60 causes the support base 56 to move the tool 28 along the Y-motion linear translator 58.

During assembly, the strip 22 is positioned within a fixture 64 and the molding base 24 is positioned within a fixture 66 at a desirable location on a work platform 68 below the assembly 26. The tool 28 is positioned above the strip 22 by indexing the assembly 26 along the X-motion linear translator 52. The tool 28 and the heater block 30 are then lowered on the Y-motion linear translator 58 until the surface 42 of the tool 28 contacts the surface 44 of the strip 22. Suction applied to the ports 36 or magnetism from the rod 46 causes the strip 22 to be secured to the tool 28. The tool 28 and the heater block 30 are then raised on the Y-motion linear translator 58 to a suitable height to remove the strip 22 from the fixture 64. Because the tool 28 is heated, the metal strip 22 begins to heat. Alternately, the strip 22 can be preheated in the fixture 64 prior to being picked up by the tool 28.

The assembly 26 is then moved in an X-direction on the X-motion linear translator 52 until it is positioned directly above the molding base 24. By this time, the strip 22 has been heated to the desirable temperature. The tool 28 and the heating block 30 are then lowered on the Y-motion linear translator 58 to contact a top surface 70 of the molding base 24 such that the contact area on the surface 70 is melted by the heat given off by the fixture 28 and the strip 22. The assembly 26 is shown in phantom in this position in FIG. 2. The bond to plastic is strong enough such that when the assembly 26 is raised, the strip 22 detaches and remains on the molding base 24. In one embodiment, the tool 28 stakes the strip 22 to the molding base 24 for about a 10 second burn time, and the overall cycle time is about 13 seconds. The cylinder 60 applies about a 20–30 psi to the strip 22 while installing. The heat causes the strip 22 to be mechanically bonded to the base 24.

Vehicle body side moldings can come in a variety of different lengths, and are typically between 2 inches and 42 inches long. Thus, the length of the tool 28 must be of a length suitable to accommodate these varying length moldings. The present invention proposes quick change fixturing that allows for various segments of differing lengths to be secured together to form the tool 28 and the heater body 30.

Figure 7:
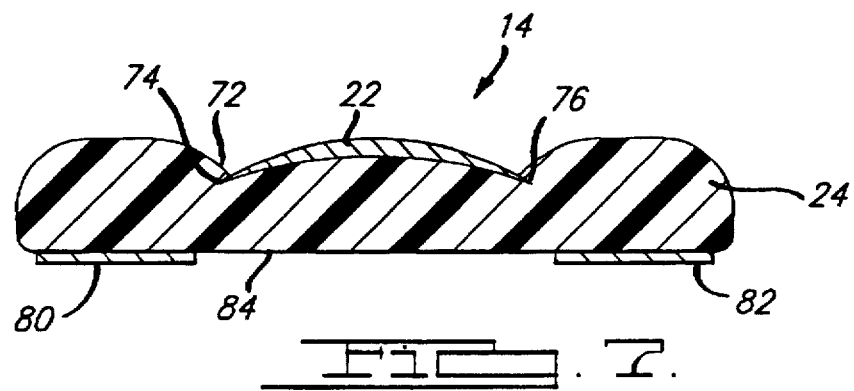
FIG. 7 is a cross-sectional view of the bodyside molding shown in FIG. 6.
Figure 8:
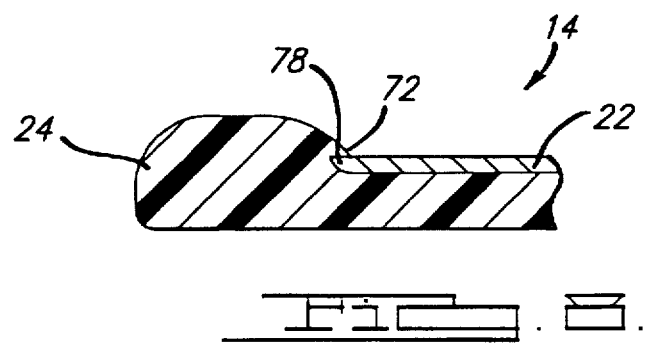
FIG. 8 is a broken-away, cross-sectional view of an end of the bodyside molding shown in FIG. 6.

FIG. 6 shows a top view, FIG. 7 shows a cross-sectional view and FIG. 8 shows a cut-away, cross-sectional end view of the molding 14. The strip 22 is secured to the molding base 24 within a suitable configured opening 72 in the base 24. As the metal strip 22 is pressed into the opening 72, edges 74 and 76 of the strip 22 melt the plastic of the base 24, and are embedded within the molding base 24. Likewise, an end 78 of the metal strip 22 is melted into, and is embedded within the plastic of the molding base 24. Double-sided adhesive strips 80 and 82 are secured to a back surface 84 of the molding base 24 to secure the molding 14 to the vehicle 10.

Figure 9:
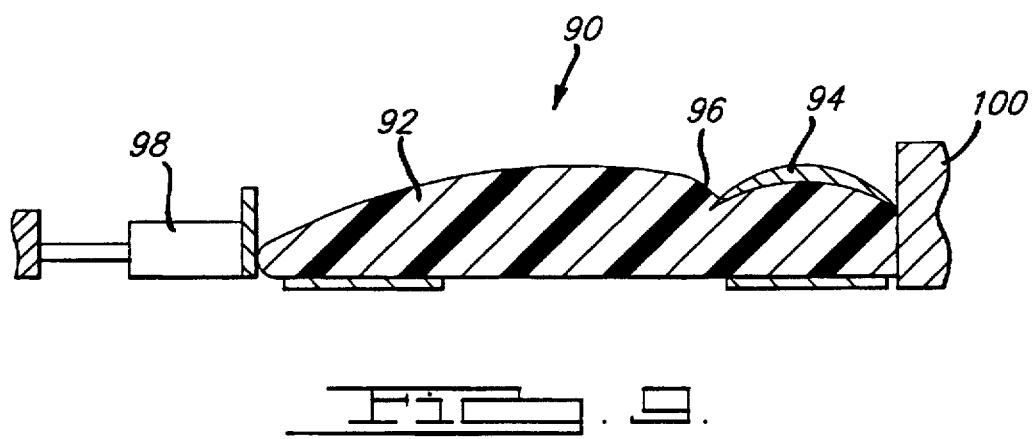
FIG. 9 is a bodyside molding including a metal strip according to another embodiment of the present invention.

FIG. 9 shows an alternate embodiment of a bodyside molding 90. The molding 90 includes a molding base 92 and a metal strip 94. The metal strip 94 is an edge trim such that it is positioned along an edge of the molding base 92 for added aesthetic appearances. During the staking of the metal strip 94 to an opening 96 within the base 92 by the assembly 26, a pushing device 98 pushes the molding 90 against a fixture 100 to hold the molding base 92 in place during the staking process.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method of assembling a trim member for a vehicle, said method comprising the steps of:

providing a trim member base positioned within a first fixture;

providing a metallic strip positioned within a second fixture;

providing a heat stake tool assembly including a staking tool;

heating the staking tool to a predetermined temperature;

securing the metallic strip to the staking tool so as to remove the metallic strip from the second fixture and heat the metallic strip;

positioning the staking tool above the trim member base;

staking the heated metallic strip connected to the staking tool into the trim member base so that the heated metallic strip melts a portion of the base; and removing the staking tool from the base so as to leave the metallic strip secured to the base to form the bodyside molding.

2. The method according to claim 1 wherein the step of providing the metallic strip includes selecting the metallic strip from the group consisting of aluminum strips and stainless steel strips.

3. The method according to claim 1 wherein the step of securing the metallic strip to the staking tool includes applying suction to the metallic strip through a vacuum system in the heat stake tool assembly.

4. The method according to claim 1 wherein the step of securing the metallic strip to the heat stake tool includes using a magnetic system.

5. The method according to claim 1 wherein the step of positioning the metallic strip above the base includes using an X-motion linear translator and associated cylinder.

6. The method according to claim 1 wherein the step of securing the metallic strip includes using a Y-motion linear translator and associated cylinder.

7. The method according to claim 1 wherein the step of providing a metallic strip includes providing a metallic strip that has been formed and end punched to a desired shape and configuration.

8. The method according to claim 1 wherein the step of providing a trim member base includes forming a thermoplastic base by a plastic forming process to have a top surface opening to accept the metallic strip.

9. The method according to claim 1 wherein the step of staking the metallic strip to the base includes causing edges and ends of the metallic strip to be embedded within the trim member base.

10. The method according to claim 1 wherein the step of heating the staking tool includes providing the heat stake tool assembly with a heater block and resistance heater rods.

11. The method according to claim 1 wherein the trim member is a bodyside molding.

12. A method of making a bodyside molding for a vehicle, said method comprising the steps of forming a bodyside molding base by a thermoplastic forming technique such that the base includes an elongated opening extending along a top surface of the base;

forming a metallic strip to have a desired shape and configuration;

positioning the bodyside molding base within a first fixture;

positioning the metallic strip within a second fixture relative to the first fixture;

providing a heat stake tool assembly, including a heat staking tool relative to the first and second fixtures;

heating the staking tool to a predetermined temperature;

securing the metallic strip to the staking tool to move the metallic strip out of the second fixture and heat the metallic strip;

positioning the staking tool above the holding base;

staking the heated metallic strip connected to the staking tool into the opening in the molding base so that the heated metallic strip melts a portion of the base and edges and ends of the metallic strip are embedded into the molding base; and removing the staking tool from the molding base so as to leave the metallic strip secured to the base to form the bodyside molding.

13. The method according to claim 12 wherein the step of providing the metallic strip includes selecting the metallic strip from the group consisting of aluminum strips and stainless steel strips.

14. The method according to claim 12 wherein the step of positioning the metallic strip above the molding base includes using an X-motion linear translator and associated cylinder.

15. The method according to claim 12 wherein the step of securing the metallic strip includes using a Y-motion linear translator and associated cylinder.

16. The method according to claim 12 wherein the step of securing the metallic strip to the staking tool includes applying suction to the metallic strip through a vacuum system in the heat stake tool assembly.

17. The method according to claim 12 wherein the step of securing the metallic strip to the staking tool includes using a magnetic system.

18. A bodyside molding to be secured to a vehicle, said bodyside molding comprising:

a thermoplastic base portion including an opening on a show surface of the base portion; and a metallic strip positioned in the opening of the molding by a heat staking process such that edges of the strip are melted into and are embedded within the base portion along the entire length of the strip so the edges are not exposed to air.

19. The bodyside molding according to claim 18 wherein the metallic strip is shaped prior to being positioned in the opening.

20. The bodyside molding according to claim 18 wherein the thermoplastic base portion is an extruded base portion.

* * * * *